US010843976B2

(12) United States Patent
Fridman et al.

(10) Patent No.: US 10,843,976 B2
(45) Date of Patent: Nov. 24, 2020

(54) METHOD OF PRODUCING NANOCONCRETE WITH HIGH-ENERGY MIXING

(71) Applicants: Vladlen Fridman, Blakeslee, PA (US); Richard Charlat, Millburn, NJ (US)

(72) Inventors: Vladlen Fridman, Blakeslee, PA (US); Richard Charlat, Millburn, NJ (US)

( * ) Notice: Subject to any disclaimer, the term of this patent is extended or adjusted under 35 U.S.C. 154(b) by 201 days.

(21) Appl. No.: 16/177,145

(22) Filed: Oct. 31, 2018

(65) Prior Publication Data
US 2020/0131094 A1 Apr. 30, 2020

(51) Int. Cl.
| | | |
|---|---|---|
| C04B 40/00 | (2006.01) |
| C04B 28/02 | (2006.01) |
| C04B 14/06 | (2006.01) |
| B28C 5/16 | (2006.01) |
| B28C 5/00 | (2006.01) |
| B01F 7/16 | (2006.01) |
| C04B 111/00 | (2006.01) |
| C04B 103/32 | (2006.01) |
| C04B 111/34 | (2006.01) |

(52) U.S. Cl.
CPC ............ *C04B 40/005* (2013.01); *B01F 7/161* (2013.01); *B28C 5/006* (2013.01); *B28C 5/16* (2013.01); *C04B 14/06* (2013.01); *C04B 28/02* (2013.01); *C04B 40/0025* (2013.01); *C04B 40/0032* (2013.01); *C04B 2103/32* (2013.01); *C04B 2111/00318* (2013.01); *C04B 2111/34* (2013.01)

(58) Field of Classification Search
None
See application file for complete search history.

(56) References Cited

U.S. PATENT DOCUMENTS

| | | | | |
|---|---|---|---|---|
| 4,330,403 A | * | 5/1982 | Fuchs | .................. B03D 1/1412 |
| | | | | 210/221.2 |
| 2013/0305963 A1 | | 11/2013 | Fridman | |
| 2019/0176106 A1 | * | 6/2019 | Boltersdorf | ............ D21B 1/347 |

OTHER PUBLICATIONS

Article titled "Technology of concrete and reinforced concrete items" by O.A. Gershberg and published in 1971 (including partial translation).*
Article titled "Nano reinforced cement and concrete composites and new perspective from graphene oxide" by Chuah et al. and published on Oct. 15, 2014.*
Article titled "Cement and Concrete Nanoscience and Nanotechnology" by Raki et al. and published on Feb. 3, 2010.*

(Continued)

*Primary Examiner* — Blake A Tankersley

(57) ABSTRACT

In a method of producing nanoconcrete according the bottom-up approach of nano technology with the High-Energy Mixing of composition including cement, water, sand, additives and superplasticizers, the mixing is performed with flow of mixture characterized by Reynolds number and Power number in the range of 20-800 and 0.1-4.0 respectively with installation a disk horizontally into mixing assembly on the top layer of activated mixture coaxially with vertical axis of assembly and with the axis of impeller rotation on the adjustable level to avoid destroying created gel as a result of interruptions of process, to increase laminarity of the mixture flow, energy absorption by the mixture, and shear stress for creation additional quantity of the nanostructured Calcium Silicate Hydrate (C-S-H) gel necessary for making nanoconcrete.

7 Claims, 13 Drawing Sheets

High-Energy Mixing (HEM) with and without movable disk.

(56) References Cited

OTHER PUBLICATIONS

Select quotations from "The Science of Concrete" by Thomas et al. and published at least by Aug. 13, 2015.*
Article titled "Influences of Mixing Methods on the Microstructure and Rheological Behavior of Cement Paste" by Yang et al. and published in 1995.*
Article titled "Processability of PVDF/PMMA blends studied by torque rheometry" by Freire et al. and published Dec. 31, 2008.*
Article titled "Interpretation of the impedance spectroscopy of cement paste via computer modelling" by Olson et al. and published in 1995.*
Article titled "A simple technique for measurement of apparent viscosity of slurries: sand-water system" by Biswas et al. and published in 2002.*
Article titled "Nanotechnology and Concrete: Research Opportunites" by Balaguru et al. and published Nov. 7, 2006.*
Article titled "Nanotechnology in concrete—A review" by Sanchez et al. and published May 15, 2010.*

* cited by examiner

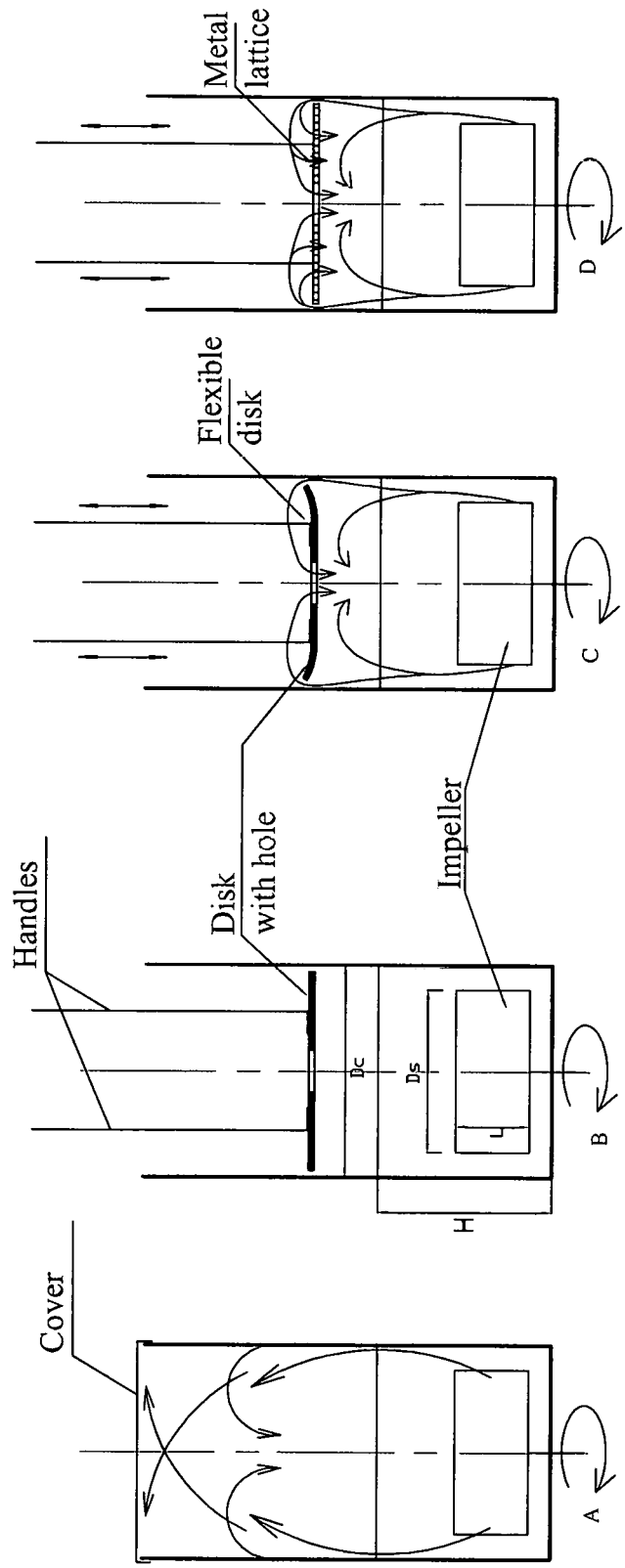
Fig. 1 High-Energy Mixing (HEM) with and without movable disk.

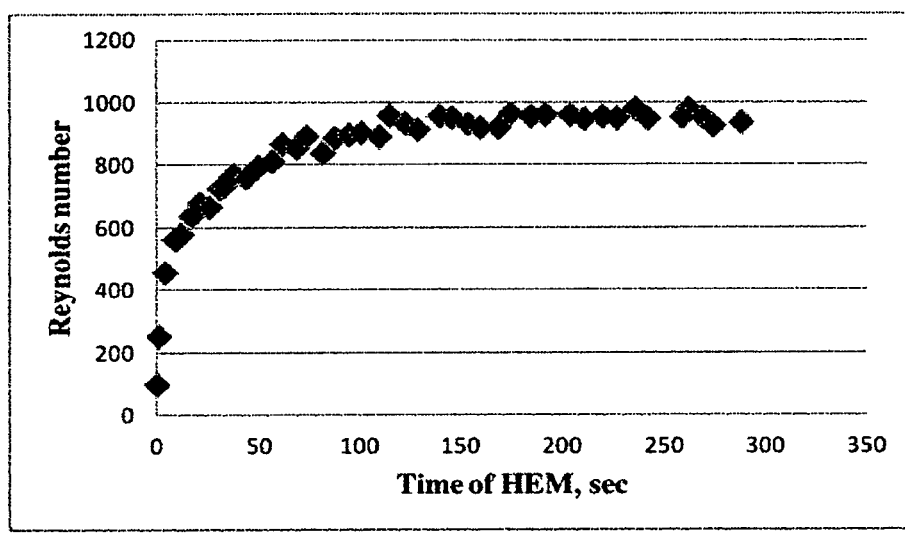
Fig. 2 Re number change in HEM of Cement-Water mixture without disk (test 1).

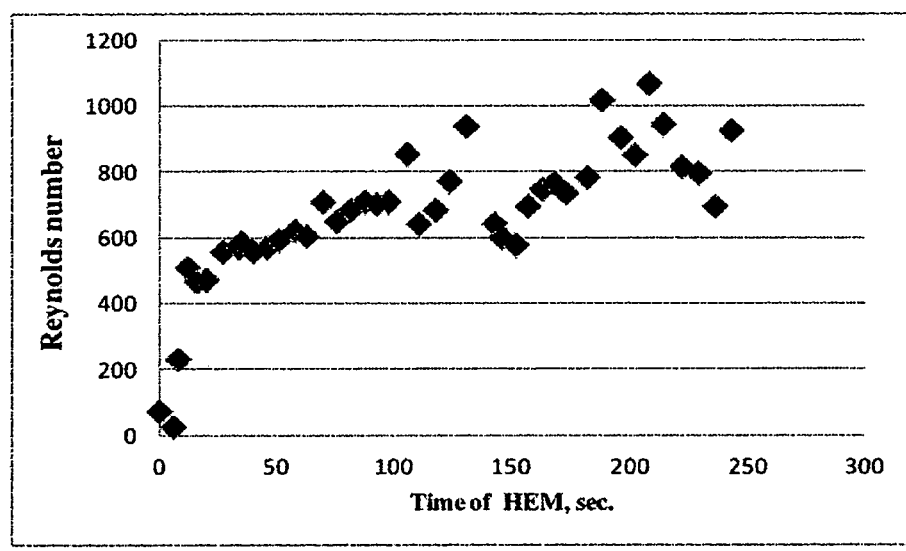
Fig. 3 Re number change in HEM of Cement-Water mixture with flexible disk (test 1).

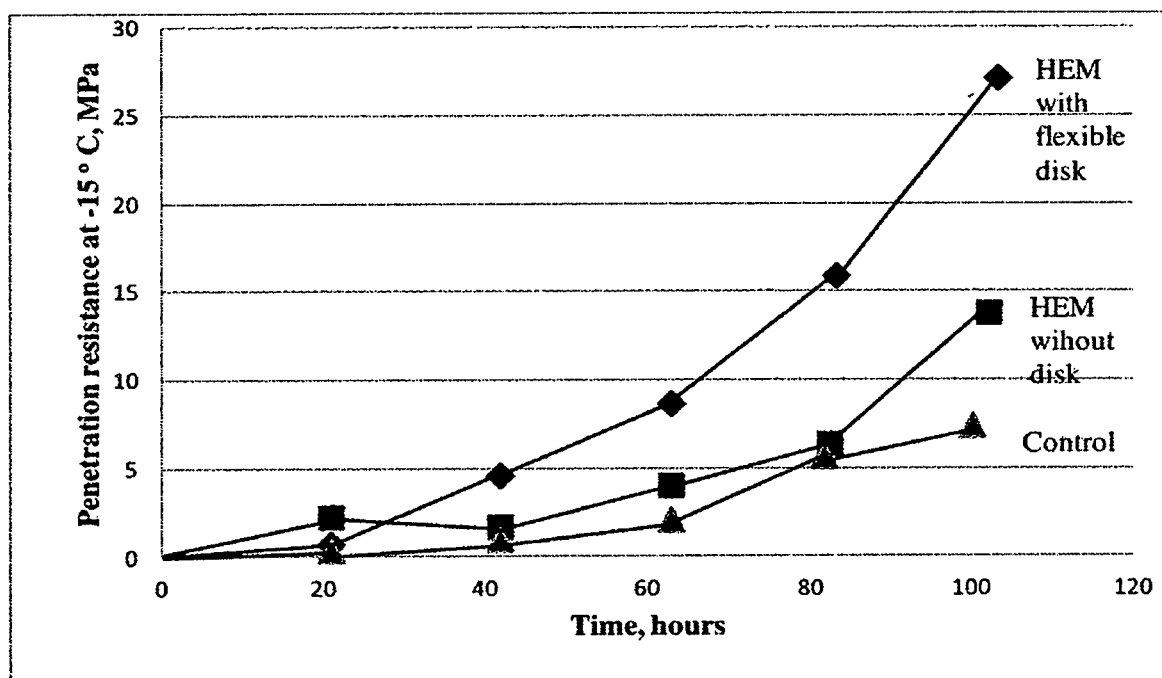
Fig. 4 Penetration resistance at -15°C of Cement-Water mixtures (test 1),

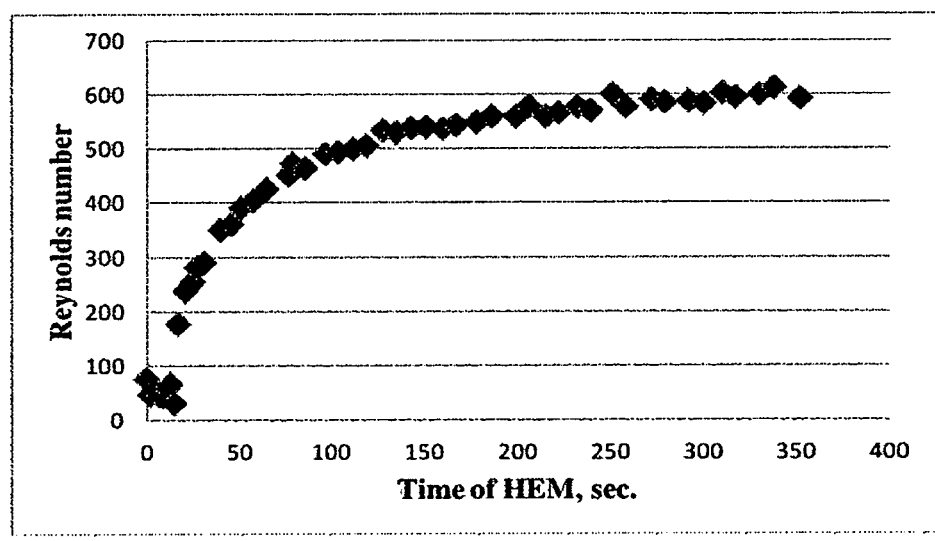
Fig. 5 Re number change in HEM of Cement-Water mixture without disk (test 2).

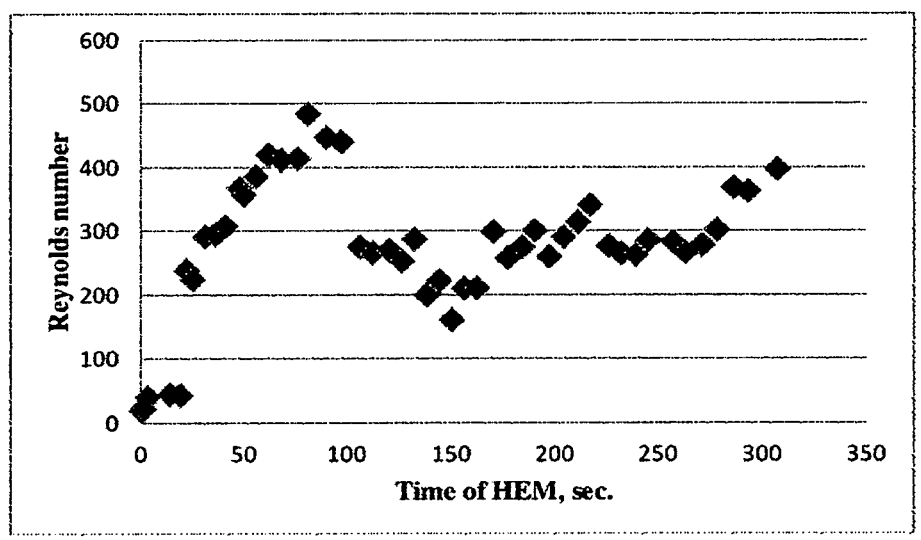
Fig. 6 Re number change in HEM of Cement-Water mixture with disk of lattice (test 2).

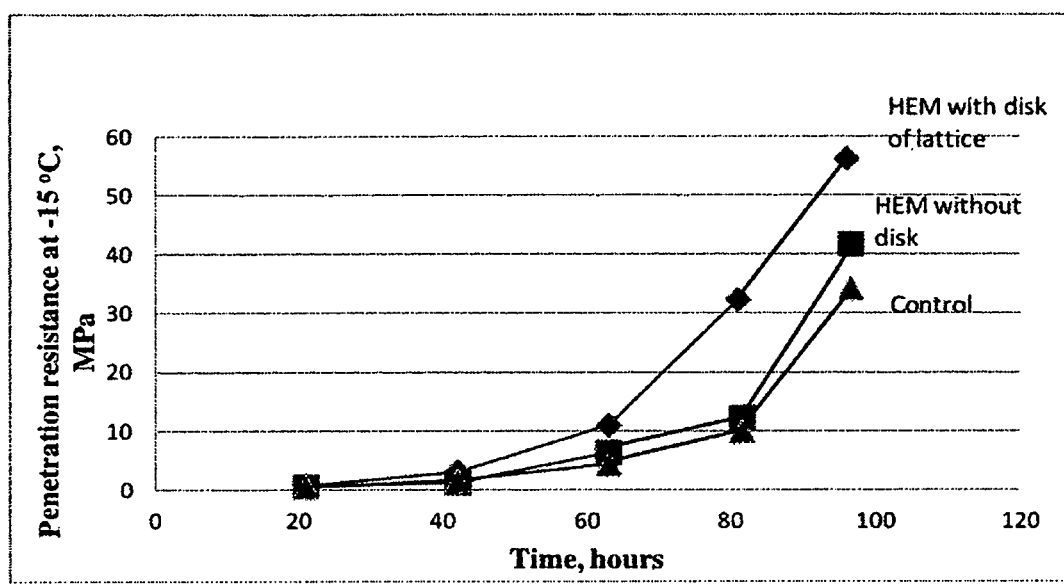
Fig. 7 Penetration resistance at -15°C of Cement-Water mixtures (test 2).

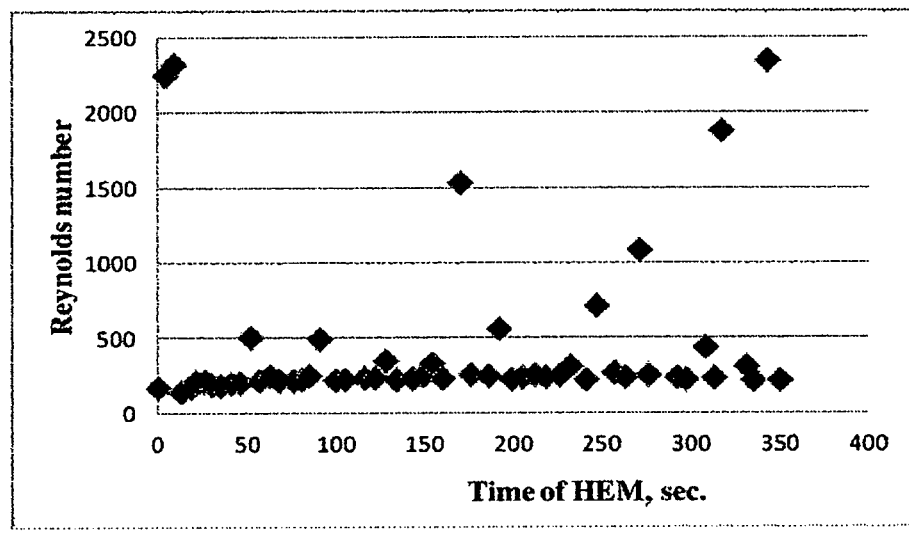
Fig. 8 Re number change in HEM of Cement-Sand-Water without disk (test 3).

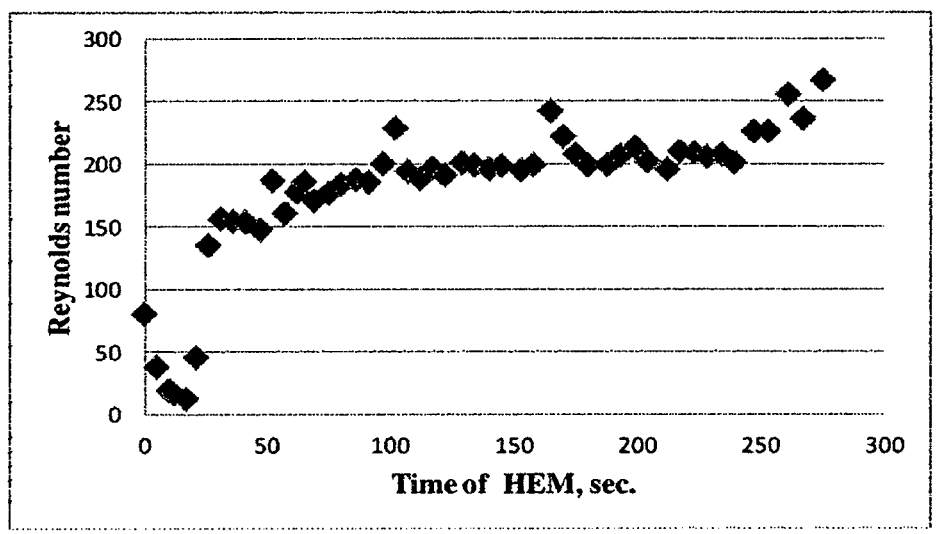
Fig. 9 Re number change in HEM of Cement-Sand-Water mixture with flexible disk (test 3).

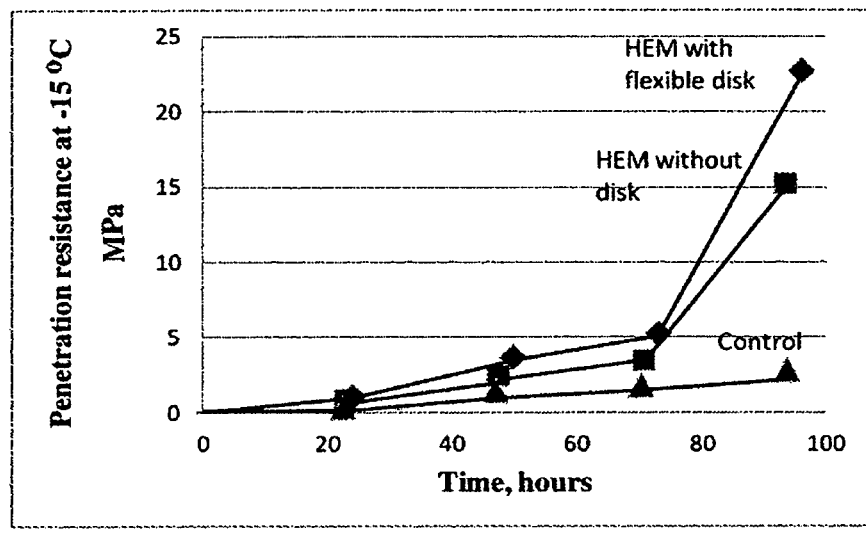
Fig. 10 Penetration resistance at -15°C of Cement-Sand-Water mixtures (test 3),

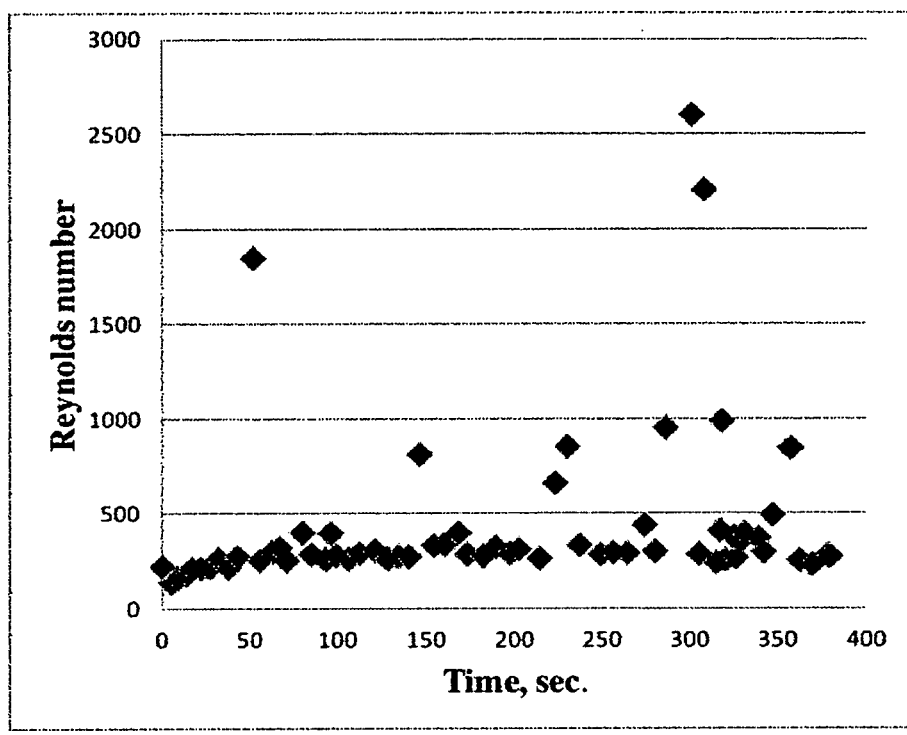
Fig. 11 Re number change in HEM of Cement-Sand-Water mixture without disc (test 4).

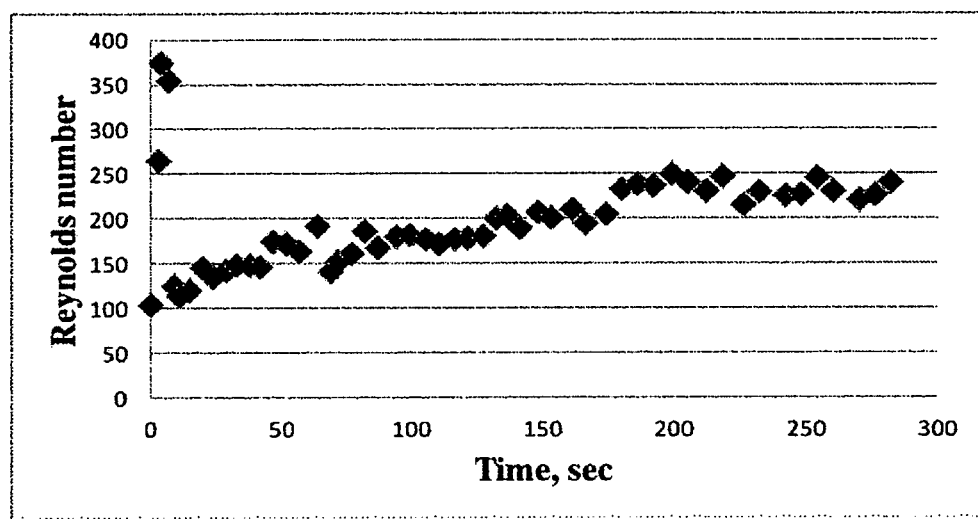
Fig. 12 Re number change in HEM of Cement-Sand-Water mixture with lattice disc (test 4).

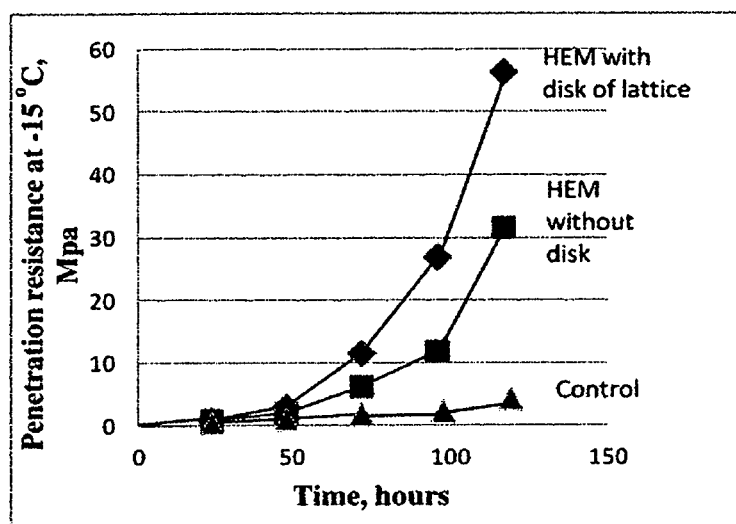
Fig. 13 Penetration resistance at -15°C of Cement-Sand-Water mixtures (test 4).

METHOD OF PRODUCING NANOCONCRETE WITH HIGH-ENERGY MIXING

BACKGROUND OF THE INVENTION

The present invention relates to methods of producing nanoconcrete by means of the bottom-up approach in Nano technology. It may correspond to International Classification: C04B 28/00, C04B 40/00, C04B 14/06 and U.S. Classification: 106/709, 106/654, 106/705.

Most of modern methods for creation nano structured cement based materials use the top-down approach of nano technology where nano-sized material is introduced in traditional material for its nano modification (Florence Sanchez, Konstantin Sobolev "Nano technology in concrete—A review" Construction and Building Materials 24 p.p. 2060-2071, 2061 [1]). Perumalsamy Balaguru, Ken Chong "Nano technology and concrete: research opportunity" National Science Foundation, USA, November 2006, paragraphs 4.1-4.8 [2], considered nano-sized cement particles, carbon nano-tubes as well as nano-scaled silica fumes and others nano-materials as perspective for nano technology of concrete using the top-down approach of Nano technology. Uniform dispersion of nano-scaled additives is attainable using various types of mechanical methods, including ultra-sonication, ball milling etc. (Samuel Chuah, Zhu Pan et al. "Nano reinforced cement and concrete composites and new perspective from graphene oxide" Construction and Building Materials 73, 2014, p.p. 113-124, see p. 116 paragraph 3.1 and p. 122 left column, paragraph 3 [3]). These processes require increased energy spending (p. 116). For instance effective dispersion of fibers made of carbon nano tubes requires 2800 Kj/l of energy. Agglomeration of nano materials is a common problem due to the strong Van der Waal's attractive forces at the nano-scale (p. 122). This requires a combination of sonication for mechanical separation and special surfactants to avoid re-agglomeration of nano particles in the cement matrix.

Concrete itself as a cement based material is an example of real nano-material because the cement hydration is a typical nano-process. The main and unique result of this process is formation of so called Calcium Silicate Hydrate colloidal material or C-S-H gel. C-S-H gel consists of globules about 5 nm in diameter which are held together mainly by Van der Waals' forces creating nano-structured layers of semi-crystalline material (Laila Raki at al. "Cement and Concrete Nano-science and Nano technology", Review, J. Materials 2010, 3, p.p. 919-942, see p. 921 [4]). However, even after three years of hardening, 30-40% (and up to 50% in conditions of low humidity) of the volume of cement grains remains unhydrated, as a result of the formation of watertight hydrated shells around the cement grains (O. A. Gershberg "The Technology of concrete and reinforced concrete items" Moscow GSI 1971, p. 27, translation is enclosed [5]). In High strength concrete made with low w/c value a significant fraction of cement must remain unhydrated due to a lack of space for hydration products formation (J. Thomas, H. Jennings "The Science of Concrete", Report of Department of Civil and Environmental Engineering Northwestern University, Evanston Ill., Chapter 5.6, page 60, paragraph 2 [6]). In the inventive method this unhydrated part of cement is considered as a potential reserve for creation of new portions of nano particles of Calcium Silicate Hydrate. The proposed process allows using this reserve at the stage of concrete mixture preparation to significantly increase the volume of the nano-structured gel and to obtain a material that can be called Nanoconcrete.

In the present invention, the principle of intensive mixing with increased energy absorption by the mixture consisting of at least cement and water was chosen as general one. M. Young and H. Jennings (Influences of Mixing Methods on the Microstructure and Rheological Behavior of Cement Paste". Elsevier Science Inc, 1995, page 71, paragraph 2, page 77, paragraph 2 [7]) suggested the processes of intensive mixing, in which the shear deformations between the layers of liquid depend on shear rate developing with the increase of the angular velocity of impeller. After increasing shear rate more than 1000 $s^{-1}$ they could achieve dispersive forces $9\times10^{-6}$ N to break agglomerates of 0.3 mm (page 77 column 2, paragraph 2). Such a dispersive force is not enough to break cement agglomerates smaller than 0.3 mm especially to create nano sized particles. A further increase in shear rate requires to significantly accelerating rotation of the impeller. This leads to a sharp increase in the Reynolds number, i.e. creates greater turbulence and therefore reduces energy absorption by the activated mixture. Thus this way is not acceptable.

In the inventive method the Portland Cement concrete is considered as a natural sours of nano-material for creation nanoconcrete in accordance with the bottom-up approach of Nano technology.

The application Ser. No. 13/476,003 published Nov. 21, 2013, as invention No: 2013/0395963A1 [8] suggests the Method of producing activated construction mixture including cement, and water with or without sand as well as traditional additives and superplasticiser. Activation is performed with dimensionless criteria Reynolds and Power numbers within the limits 20-800 and 0.1-4.0 respectively for increasing water adsorption with Calcium Silicate Hydrate colloid formation and acceleration cement hydration. The research of this process was continued by testing the mixtures with and without sand and shows that the development of Calcium Silicate Hydrate colloid formation in some cases accompanied by increase of the mixture viscosity. As a result of this phenomenon starting from some point the circulation of the mixture breaks off, and interruptions of the mixture flow happen causing strokes and partial gel destruction. This phenomenon is more typical for mixtures containing sand. Some of mixtures require increasing impeller velocity in order to shorten process of activation. This increases of turbulence and reduces energy absorption worsening effectiveness of High-Energy Mixing process. All of these negative phenomena should be reduced or eliminated to make process more effective.

Two representative mixtures with relation cement, sand and water 1:0.00:0.37 (1) and 1:0.64:0.37 (2) were considered as a binders for making nanoconcrete when using two stage mixing concrete. According to this technology the binders mechanically activated in the High-Energy mixer (first stage) then are mixed with aggregates in conventional mixer (second stage). As a result of this inventive method these binders will possess increased quantity of nanostructured C-S-H gel that is necessary for creation of Nanoconcrete in accordance with the bottom-up approach of nano technology.

SUMMARY OF THE INVENTION

Accordingly, it is an object of the present invention to provide a Method of producing nanoconcrete using traditional materials—cement and water with or without sand by means of creating conditions for increasing quantity of nano-structured C-S-H gel in the process of High-Energy Mixing. This method is a development of the "Method of producing activated construction mixture" (The application Ser. No. 13/476,003 published Nov. 21, 2013, as invention No: 2013/0395963A1 [8]). In keeping with this object and with others which will become apparent hereinafter the main feature of the present invention resides in a method of producing nanoconcrete according to the bottom-up approach of nano technology with the High-Energy Mixing of a composition consisting of at least cement and water, mixing is performed with a mixture flow characterized by dimensionless criteria Reynolds number and Power number in the range of 20-800 and 0.1-4.0 respectively with installation a disk horizontally into mixing assembly on the top layer of activated mixture coaxially with vertical axis of assembly and with the axis of impeller rotation (FIG. 1-B) on the adjustable level, to avoid destroying created gel as a result of interruptions of High-Energy mixing, to increase laminarity of the mixture flow, energy absorption by the mixture, and shear stress for creation additional quantity of the nanostructured Calcium Silicate Hydrate (C-S-H) gel necessary for making nanoconcrete.

The novel features which are considered as characteristic for the present invention are set force in particular in the appended claims. The invention itself however, both as to its construction and its method of operation, together with additional objects and advantages thereof, will be best understood from the following description of specific embodiments when read in connection with the accompanying drawings and table.

BRIEF DESCRIPTION OF DRAWINGS AND TABLE

FIG. 1 High-Energy Mixing with and without movable disk.
A—Circulation of mixture in the High-Energy Mixer with cover and without movable disk,
B—High-Energy Mixer equipped with movable disk located horizontally and having the central hole. Disk made of flexible material or of metal lattice. The handles attached to disk for installing it at the top layer of activated mixture.
C—Circulation of mixture with disk made of flexible material.
D—Circulation of mixture with disk made of metal lattice.
H—Top of mixture before impeller rotation, L and $D_s$—height and diameter of cylindrical surface formed when the impeller rotates, $D_c$—diameter of container.

FIG. 2 Re number change in High-Energy Mixing without movable disk (test 1, variant #23A*),
*The number of variant in the laboratory journal and Excel file "Working with Olson's effect" is shown.
Cement:Sand:Water=1:0.00:0.37.
Characteristics of process: quantity of interruptions—0, coefficient of power absorption by the mixture 0.516, Re average 826, Power number average 0.18, Rpm average 2889 (Rpm for empty activator 3066), absorption of the specific energy by the mixture E=50.6 K j/kg, average Shear stress 1709 N/m², self heating of the mixture as a result of mechanical activation Δt=21° C. during 288 sec. of activation.

FIG. 3 Re number change in High-Energy Mixing with movable disk of flexible material (test 1, variant 23), Cement:Sand:Water=1:0.00:0.37.
Characteristics of process: quantity of interruptions—0, coefficient of power absorption by the mixture 0.580, Re average 668, Power number average 0.137, Rpm average 2849 (Rpm for empty activator 3066), absorption of the specific energy by the mixture E=55.3 K j/kg, average Shear stress 2370 N/m², self heating of the mixture as a result of mechanical activation Δt=20° C. during 243 sec. of activation.

FIG. 4 Penetration resistance development at temperature −15° C. (test 1),
Cement:Sand:Water=1:0.00:0.37.
Activation: 1—HEM with disk made of flexible material (K c-s-h=3.63), 2—HEM without disk (K c-s-h=1.74). K c-s-h is relation between areas of graphs for activated variant and control variant, made with conventional mixing—3.

FIG. 5 Re number change in High-Energy Mixing without movable disk (test 2, variant #38A),
Cement:Sand:Water=1:0.00:0.37.
Characteristics of process: quantity of interruptions—0, coefficient of power absorption by the mixture 0.561, Re average 424, Power number average 0.42, Rpm average 2730 (Rpm for empty activator 3060), absorption of the specific energy by the mixture E=82.9 K j/kg, average Shear stress 4119 N/m², self heating of the mixture as a result of mechanical activation Δt=22° C. during 352 sec. of activation.

FIG. 6 Re number change in High-Energy Mixing with movable disk of metal lattice (test 2, variant #38), Cement:Sand:Water=1:0.00:0.37.
Characteristics of process: quantity of interruptions—0, coefficient of power absorption by the mixture 0.605, Re average 276, Power number average 0.55, Rpm average 2654 (Rpm for empty activator 3060), absorption of the specific energy by the mixture E=86.7 K j/kg, average Shear stress 6395 N/m², self heating of the mixture as a result of mechanical activation Δt=22° C. during 307 sec. of activation.

FIG. 7 Penetration resistance development at temperature −15° C. (test 2),
Cement:Sand:Water=1:0.00:0.37.
Activation: 1—HEM with disk made of metal lattice (K c-s-h=2.25), 2—HEM without disk (K c-s-h=1.22). K c-s-h is relation between areas of graphs for activated variant and control variant, made with conventional mixing—3.

FIG. 8 Re number change in High Energy Mixing without flexible disk (test 3, variant #34DA), Cement:Sand:Water=1:0.64:0.37.
Characteristics of process: quantity of interruptions 10, coefficient of power absorption by the mixture—0.485, Re average 447, Power number average 0.39, Rpm average 2260 (Rpm for empty activator 2387), absorption of the specific energy by the mixture E=50.9 K j/kg, average Shear stress 3002 N/m², self heating of the mixture as a result of energy absorption Δt=25° C. during 350 sec. of activation.

FIG. 9 Re number change in High-Energy Mixing with flexible disk (test 3, variant 34D), Cement:Sand:Water=1:0.64:0.37.
Characteristics of the process: quantity of interruptions 0, coefficient of power absorption 0.60, Re average 178.7, Power number average 0.792, Rpm average 2151 (Rpm for empty activator 2387), absorption of the specific energy by the mixture 63.46 Kj/kg, average Shear stress 5389 N/m², self heating of the mixture as a result of energy absorption Δt=25° C. during 275 sec. of activation.

FIG. 10 Penetration resistance development at temperature −15° C. (test 3).
Cement:Sand:Water=1:0.64:0.37.
Activation: 1—HEM with disk made of flexible material (K c-s-h=4.2), 2—HEM without flexible disk (K c-s-h=2.80). K c-s-h is relation between areas of graphs for activated variant and control variant, made with conventional mixing—3.

FIG. 11 Re number change in High-Energy Mixing without metal lattice disk (test 4 variant #37A), Cement:Sand:Water=1:0.64:0.37.
Characteristics of process: quantity of interruptions—9, coefficient of power absorption by the mixture 0.460, Re average 433, Power number average 0.28, absorption of the specific energy by the mixture E=48 K j/kg., Rpm average 2262 (Rpm for empty activator 2385), average Shear stress 2643 N/m$^2$, self heating of the mixture as a result of energy absorption Δt=25° C. during 379 sec. of activation.

FIG. 12 Re number change in High-Energy Mixing with metal lattice disk (test 4, variant #37), Cement:Sand:Water=1:0.64:0.37.
Characteristics of process: quantity of interruptions—0, coefficient of power absorption by the mixture 0.577, Re average 197, Power number average 0.468, Rpm average 2211 (Rpm in empty activator 2387), absorption of the specific energy E=56.57 K j/kg, average Shear stress 4204 N/m$^2$, self heating of the mixture as a result of energy absorption Δt=25° C. during 282 sec. of activation.

FIG. 13 Penetration resistance development at temperature −15° C. (test 4) Cement:Sand:Water=1:0.64:0.37.
Activation: 1—HEM with disc made of grid bars (K c-s-h=8.5), 2—HEM without disk, (K c-s-h=4.4). K c-s-h is relation between areas of graphs for activated variant and for the control variant made with conventional mixing—3.

sionless criteria Reynolds number and Power number in the range of 20-800 and 0.1-4.0 respectively is proposed.

The inventive method includes installation a disk horizontally into mixing assembly (FIG. 1-B) at the top layer of activated mixture coaxially with vertical axis of assembly and with the axis of impeller rotation on the adjustable level, to avoid destroying created gel as a result of interruptions of High-Energy mixing, to increase laminarity of the mixture flow, energy absorption by the mixture, and shear stress for creation additional quantity of the nanostructured Calcium Silicate Hydrate (C-S-H) gel necessary for making nanoconcrete.

The inventive method comprise forming the activating assembly as a small scale working prototype of a production scale activating assembly, monitoring a temperature of the activated mixture, power consumption and impeller rotation parameters with and without mixture by a sensor and measuring devices, and inputting running values of said parameters as variables and geometrical parameters of the activating assembly as constants and outputting running and average values of measured and calculated parameters including the temperature of activated mixture, net power consumption, apparent dynamic viscosity, shear stress and the dimensionless criteria Reynolds and Power numbers, by a computer device.

In activation with High-Energy Mixing according the present invention the main part of the activated mixture is located under disk. The volume of circulating mixture increases in comparing with original one when impeller

TABLE 1

Improvement of technical parameters of the High-Energy mixing (HEM) process and C-S-H gel increase with introducing of the movable disk in mixing assembly.

| | | | The main indexes of High-Energy Mixing | | | | | |
|---|---|---|---|---|---|---|---|---|
| Test #, FIG. | Cement/ Sand/ Water ratio | disk | Quantity Of interruptions | Re average | Coefficient of Power absorption | Specific Energy Absorption KJ/kg | Average Shear Stress, N/m$^2$ | K c-s-h |
| 1, FIG. 2 | 1:0.0:0.37 | No disk | 0 | 826 | 0.516 | 50.6 | 1709 | 1.74 |
| 1, FIG. 3 | 1:0.0:0.37 | With flexible disk | 0 | 668 | 0.580 | 55.3 | 2370 | 3.63 |
| 2, FIG. 5 | 1:0.0:0.37 | No disk | 0 | 424 | 0.561 | 82.9 | 4119 | 1.22 |
| 2, FIG. 6 | 1:0.0:0.37 | Disk Of Metal lattice | 0 | 276 | 0.605 | 86.7 | 6395 | 2.25 |
| 3, FIG. 8 | 1:0.64:0.37 | No disk | 10 | 447 | 0.485 | 50.9 | 3002 | 2.8 |
| 3, FIG. 9 | 1:0.64:0.37 | With Flexible disk | 0 | 178.7 | 0.60 | 63.46 | 5389 | 4.2 |
| 4, FIG. 11 | 1:0.64:0.37 | No disk | 9 | 433 | 0.46 | 48.0 | 2643 | 4.4 |
| 4, FIG. 12 | 1:0.64:0.37 | Disk Of Metal lattice | 0 | 197 | 0.577 | 56.57 | 4204 | 8.5 |

DESCRIPTION OF THE PREFERRED EMBODIMENTS

According to the present invention, a method for producing nanoconcrete in compliance with the bottom-up approach of nano technology, based on a high-energy mixing of a composition consisting of cement and water, mixing is performed with a mixture flow characterized by dimensionless criteria Reynolds number and Power number in the range of 20-800 and 0.1-4.0 respectively is proposed.

doesn't rotate and excess of it is moving up around flexible disk (FIG. 1-C) or disk made of metal lattice (FIG. 1-D) on the top of it and further through the central opening down to rotating impeller. All of this happens because vortex sucks excess of mixture back to main volume. This reduces dispersion of the mixture inside the mixer.

In the device of a disk suspension the opportunity of its displacement on vertical direction is provided. The viscosity of mixture changes during the process of activation as a result of C-S-H gel formation. In some cases especially if the mixture contains sand the interruptions of the mixture circulation occurs and the power consumption fells down. The shift of the disk down allows avoiding interruptions of the process and restores the power consumption.

In the inventive method vertical adjustment of disk location is provided through hangers (FIG. 1-B,C,D) with separate mechanical device (here didn't shown).

The results of tests presented in graphs FIG. 2-FIG. 13 and in Table 1 show that introducing of the disk into the mixer and installation of it at the top layers of the mixture during High-Energy Mixing improve conditions of activation, namely allows to avoid interruptions of the process, increases laminarity of flaw (or reduces Re number) of the activated mixture and as a result rises absorption of energy by the mixture and increases shear stress. All of this makes better conditions for creation additional quantity of nano structured C-S-H gel.

In the present invention the average value of Reynolds number significantly reduced by using disc made of an elastic material or a metal lattice, i.e. turbulence decreases and laminar flow of the mixture increases during the process of High-Energy mixing. This corresponds to an increase in the absorption of energy by a mixture consisting only of cement and water, and also containing sand. As a result the shear stress between the particles of the mixture significantly increases (see Table 1). This indicates an improvement in activation efficiency because of greater localization of the circulating mixture in comparing with activation without a disk where the mixture is dispersed throughout the full volume of the mixer (FIG. 1-A). As a result, conditions are created for a significant increase in the index of extension the relative content of nano-structured C-S-H gel (Table. 1).

In the inventive method it is possible to provide changing a volume of activated mixture by proportionally changing geometric parameters of the activating assembly while maintaining constant average values of net specific power and Reynolds and Power numbers for each particular task and mixture.

In the inventive method it is possible also to provide occurring at production small changes in the volume of the mixture activated with HEM by moving up and down the disk made of flexible material or the metal lattice inside the same cylindrical container designed for required maximal volume.

State of water in the volume of C-S-H gel increased as a result of High-Energy Mixing according the inventive method can be present within the interlayer structure as $H_2O$ or $OH^-$. The capillary pores 10-50 nanometers in diameter and larger than 3-5 micrometers between C-S-H clusters can contain free water solution.

According R. A. Olson at al. ("Interpretation of the impedance spectroscopy of cement paste via computer modeling, Part III Microstructural analysis of frozen cement paste", Journal of materials science 30, 1995, p. 5081 [9]) the calorimetric results of hardened cement paste show three well-defined peaks at approximately −8, −23, and −40° C. The peak at −8° C. is due to freezing bulk water in macro pores. The peak at −23° C. corresponds to the freezing of the smaller capillary pores of C-S-H gel, while the rather broad peak at −40° C. represents the low temperature transition of supersaturated solution in gel pores. Very little additional freezing occurs below this last peak.

Taking into account the results of the Mr. Olson research shown here above in order to evaluate the main result obtained from the application of the present invention, in the inventive process an approximate quantitative method of comparing mixtures with different amounts of C-S-H gel was created and used. The method is based on the determination of Penetration Resistance development of the cement containing mixtures hardening at temperature −15° C. during several days. At these conditions the liquid phase in nano-sized pores of C-S-H gel doesn't freeze and able to interact with cement increasing the Penetration Resistance. The index of penetration resistance is determined every day after thawing when the mixture temperature increases from −15° C. to +5° C. This non standardized method was broadly used in this invention for approximate estimation of the quantity of C-S-H gel increase after the inventive method of High-Energy Mixing in comparison with already known method ("Method of producing activated construction mixture", the application Ser. No. 13/476,003 published Nov. 21, 2013, as invention No: 2013/0395963A1 [8]) and conventionally mixed control variant. For this purpose the coefficient ($K_{c-s-h}$) was created and used. $K_{c-s-h}$ is defined as the ratio of the areas of the graphs "Penetration Resistance in psi-aging time at −15° C. in hours" (see FIG. 4, 7, 10, 13 and Table 1).

Water in nano pores of C-S-H gel has a greater density i.e. smaller specific volume than ordinary water, filling micro and macro pores and capillaries in hardening cement paste. This can cause chemical shrinkage, which in ordinary concrete is small and does not create large internal stresses (J. Thomas, H. Jennings "The Science of Concrete" 2108, § 5.3.1.1., p. 50 [6A]). In the case of nanoconcrete, where the volume of gel can be increased several times the risk of chemical shrinkage increases, which may cause the necessity of adding shrinkage compensating additives. This is provided by this invention.

The Physical Basis of the High-Energy Mixing (HEM) Process

The necessity to control the flow of the mixture developing in the mixer and effectiveness of energy usage requires considering additional parameters to calculate Reynolds and Power numbers. This also allows transferring the technological process fulfilled on the small scale activator to big production scale machine keeping the same levels of these criteria. It requires to consider some groups of parameters: geometrical parameters such as diameter of impeller rotation—Ds (m), height of blade—L (m), diameter of container—Dc (m) and height of mixture in container before mixing-activation—H (m); physical parameters such as net power of activation—ΔP (Watt) and total power input—P (Watt), net energy of activation—ΔE and total input of energy E (joules), as well as velocity of impeller—N (Rpm and Rps).

Physical parameters values of the turned on empty activator labeled here as $X_0$, the current values of them taken in the process of activation are labeled as $X_t$. The present invention is based on experiments with multiple variations of these parameters during the activation of construction mixtures prepared with different proportions of cement, sand and water as well as with variety of impellers and their rotational speed.

Formulas for above mentioned dimensionless criteria to control their flow during the activation are formulas for stirred vessel (P. K. Biswas, K. M. Godiwalla, D. Sanyal, S. C. Dev "A simple technique for measurement of apparent viscosity of slurries: sand-water system", Materials & Design, India Elsevier Science Ltd. Vol. 23, 2002, p. 511-519, see p. 512, right column, [10]):

$$Re = (\rho N D_s^2)/\eta \quad (1)$$

$$Np = \Delta P/(\rho N_t^3 D_s^5) \quad (2)$$

where ρ is a density of the mixture in kg per cu. m, $N_t$ is a speed of impeller in Rps (revolutions per second), $D_s$—diameter of impeller in m, η—apparent dynamic viscosity in Pas (Pascal-second), ΔP—net power in watt.

In the present invention the mixer-activator considered as a kind of rotational viscometer. It creates a possibility to use equations (1), (2) and (5) from (E. Freire et al. "Process ability of PVDF/PMMA blends studied by torque rheometry," Materials Science and Engineering C 29, pp. 657-661, Elsevier 2009 [11]), to calculate the apparent dynamic viscosity (η) values in Pas through shear stress and shear rate herein used formulas (see p.p. 658,659) transformed for conditions of High-Energy mixing:

$$\eta = \tau/\gamma, \quad (3)$$

Where, τ is shear stress in N/m2, γ is shear rate in sec$^{-1}$.

$$\tau = \Delta \text{torque}/(2\pi \times R_s^2 \times L), \quad (4)$$

$$\gamma = (2 \times (2\pi \times N_t) \times R_c^2)/(R_c^2 - R_s^2) \quad (5)$$

Thus all these values may be calculated having the geometrical parameters of activator ($R_c$, $R_s$ and L) mentioned above (see FIG. 1) as well as the data of rotation velocity ($N_t$), net torque: $\Delta T = P_t/(2\pi \times N_t) - P_0/(2\pi \times N_0)$ and net Power: $\Delta P = P_t - P_0$ measured during the process of activation with HEM.

The equation for dynamic viscosity is valid for rotational viscometers with the rotated cylinder or blades immersed into liquid. In the present invention the main apparatus consists of the cylindrical container and impeller with straight or skewed blades (FIG. 1-B). The calculated dynamic viscosity (l) named as "apparent dynamic viscosity" of the mixture in the process of activation is a result of inertial forces action, developing into mixture, and consequently may be used as a denominator in the formula of Reynolds number. By adjusting the position of the flexible disk or disk made of metal lattice, it is possible to influence internal inertial forces. This changes the apparent dynamic viscosity and, consequently, the Reynolds number, Power number, specific absorbed energy and shear stress (see the sample of calculation of these parameters in "Method of producing activated construction mixture", U.S. patent application Ser. No. 13/476,003 publication No US 2013/0305963.2013, Table 2, page 5-6 [8].

In the inventive method further comprising forming the activating assembly as a small scale working prototype and/or a production scale activating assembly, monitoring a temperature of the activated mixture, power consumption and paddle rotation parameters with and without a mixture by a sensor and measuring devices; and inputting running values of said parameters as variables and geometrical parameters of the activating assembly and density of mixture as constants and outputting running and average values of measured and calculated parameters including gross and net power consumption, shear stress, apparent dynamic viscosity, and the dimensionless criteria Reynolds and Power numbers as well as interruptions of process and temperature of the mixture by a computer device.

The expected rotational velocity of the production scale mixer loaded with mixture, N (Rps) calculated as average from the conditions:

$$Re_{small\ scale\ mixer} = Re_{production\ scale\ mixer}; \quad \text{1-st,}$$

$$N_{small\ scale\ mixer} = N_{production\ scale\ mixer}. \quad \text{2-nd,}$$

The expected velocity of impeller for the empty production scale mixer should be increased by multiplying this calculated value on the ratio $N_{empty}/N_{loaded}$ known for the small scale mixer.

In the inventive method calculation of production scale High-Energy mixer comprising proportionally changing a volume of small scale working prototype and other geometric parameters named here above while maintaining equals for small and production scale of mixing assembly maximal and average values of gross and net specific power and average values of Reynolds and Power numbers in order to correctly choose drive and geometry of the production scale mixer for each particular task and mixture. See the example of the results of calculation of the production scale the High-Energy mixer in "Method of producing activated construction mixture", U.S. patent application Ser. No. 13/476,003 publication No US 2013/0305963, 2013, Table 3, page 6 [8].

It will be clear that changes in the details, materials, steps and arrangement of parts which have been described and illustrated to explain the nature of the present invention as well as eliminating some of claimed parameters of invented process may be made by those skilled in the art upon reading of this disclosure with attaining considerable increase of C-S-H gel and other shown above changes of properties of the High-Energy Mixed mixture and in spite of it continue to stay within the principles and scope of present invention.

It will be understood that each of the elements described above, or two or more together, may also find a useful application in other types of method differing from the type described above.

While the invention has been illustrated and described as embodied in a method for producing nanoconcrete with the High-Energy Mixing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the stand point of prior art, fairly constitute essential characteristics of the generic or specific aspects of this invention.

What is claimed as new and desired to be protected by Letters Patent is set forth in appended claims.

The invention claimed is:

1. A method of producing nanoconcrete comprising:
   providing a mixing container and an impeller;
   filling the container with cement and water;
   installing a disk horizontally with respect to a direction of gravity and coaxially with respect to an axis of rotation of the impeller into the mixing container above the impeller and/or above the cement and water; and
   rotating the impeller to perform High-Energy Mixing (HEM) with the cement and water such that a mixture flow is characterized by dimensionless Reynolds number and Power number in the range of 20-800 and 0.1-4.0 respectively,
   wherein the impeller forces a bottom of the mixture up to a top of the mixture during the High-Energy Mixing (HEM),
   wherein the High-Energy Mixing (HEM) creates nanostructured Calcium Silicate Hydrate (C-S-H) gel, and
   wherein the disk prevents the created gel from being destroyed from interruptions in the High-Energy Mixing (HEM) and increases an amount of the gel that is created by increasing laminarity of the mixture flow, said increase in laminarity causing an increase in the mixture's energy absorption and shear stress.

2. The method of claim 1, wherein the filling of the container also comprises filling the container with sand, superplasticiser, and shrinkage compensating additives.

3. The method of claim 1, wherein the disk has an opening at a center of the disk for a part of the mixture that goes near and/or onto a top of the disk during the High-Energy Mixing (HEM) to circulate back down, and
wherein the disk is fabricated from flexible material or a metal lattice.

4. The method of claim 1, wherein a height of the disk inside of the container is adjustable.

5. The method of claim 1, further comprising:
providing measuring devices to measure the temperature of the mixture and power consumption and the rotational speed of the impeller;
measuring the power consumption and the rotational speed of the impeller when the container is empty;
measuring the power consumption and the rotational speed of the impeller during the High-Energy Mixing (HEM); and
calculating the dimensionless Reynolds number and Power number from the measured power consumptions and the rotational speeds of the impeller along with the mixture's density and geometrical parameters,
wherein the container, impeller, and disk are part of a small scale working prototype, and
wherein the calculated Reynolds number and Power number can be used to scale up to a production scale.

6. A method of producing multiple batches of nanoconcrete comprising:
creating a first batch of nanoconcrete according to the method of claim 1; and
creating a second batch of nanoconcrete,
wherein a volume of the mixture used to create the first batch of nanoconcrete is different than a volume of the mixture used to create the second batch of nanoconcrete,
wherein average values of gross and net specific power, Reynolds number, and Power number are the same during the creating of the first batch and the creating of the second batch, and
wherein geometric parameters are proportionally changed between the creating of the first batch and the creating of the second batch.

7. The method of claim 6, wherein the same container is used in the creating of the first and second batch,
wherein the changing of the geometric parameters include moving the disk and the impeller up or down according to a level of the mixture, and
wherein the average values of the gross and net specific power, Reynolds number, and Power number are kept the same by adjusting a power provided to the impeller during the High-Energy Mixing (HEM).

* * * * *